(No Model.) 4 Sheets—Sheet 1.
C. B. BOSWORTH.
DEVICE FOR TESTING PRESSURE GAGES.

No. 476,512. Patented June 7, 1892.

WITNESSES
W. E. Schneider.
E. K. Stewart.

INVENTOR
Charles B. Bosworth
W. Singleton atty.

(No Model.) 4 Sheets—Sheet 2.
C. B. BOSWORTH.
DEVICE FOR TESTING PRESSURE GAGES.
No. 476,512. Patented June 7, 1892.

WITNESSES.
W. E. Schneider
E. N. Stewart

INVENTOR
Charles B. Bosworth
per W. H. Singleton atty

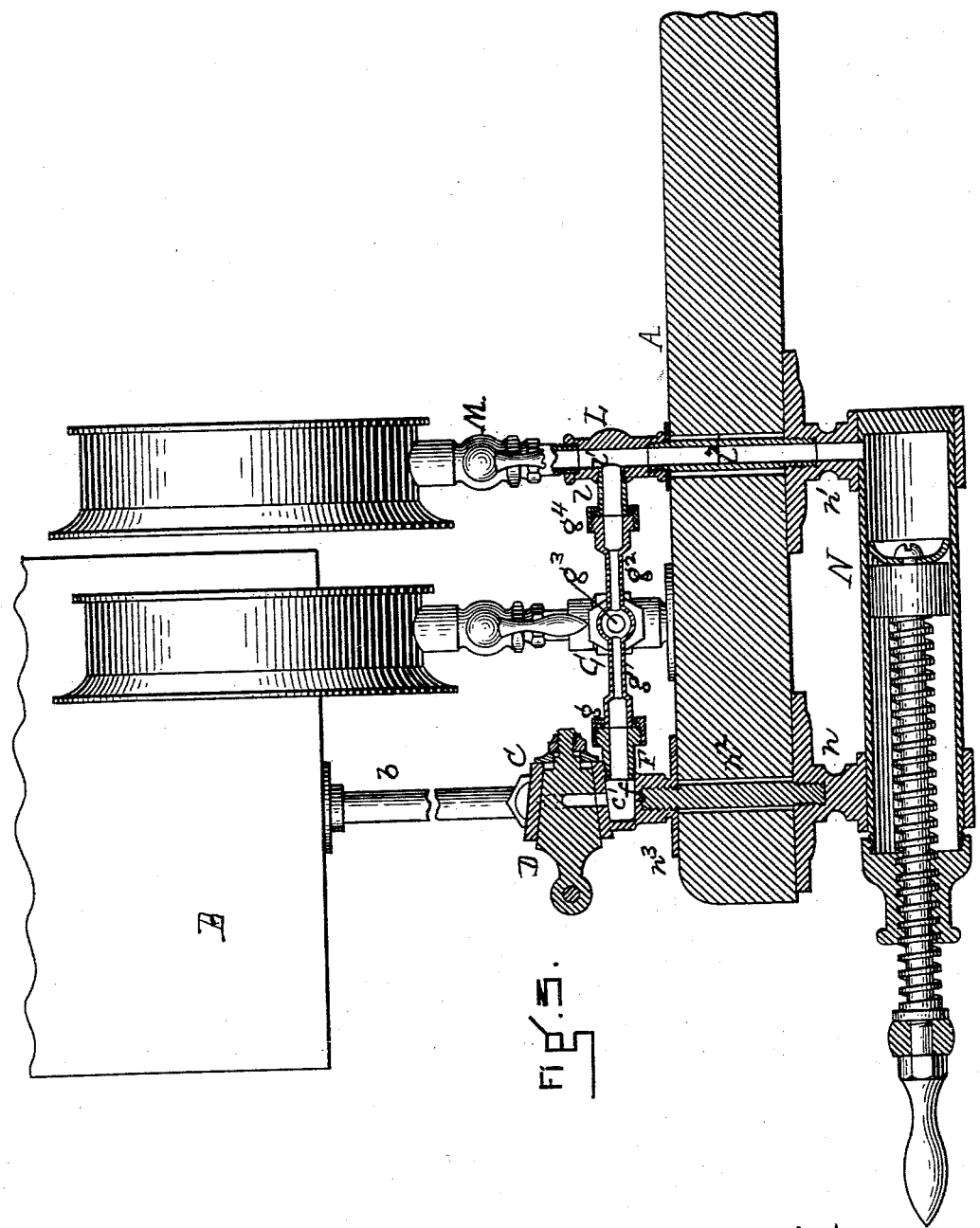

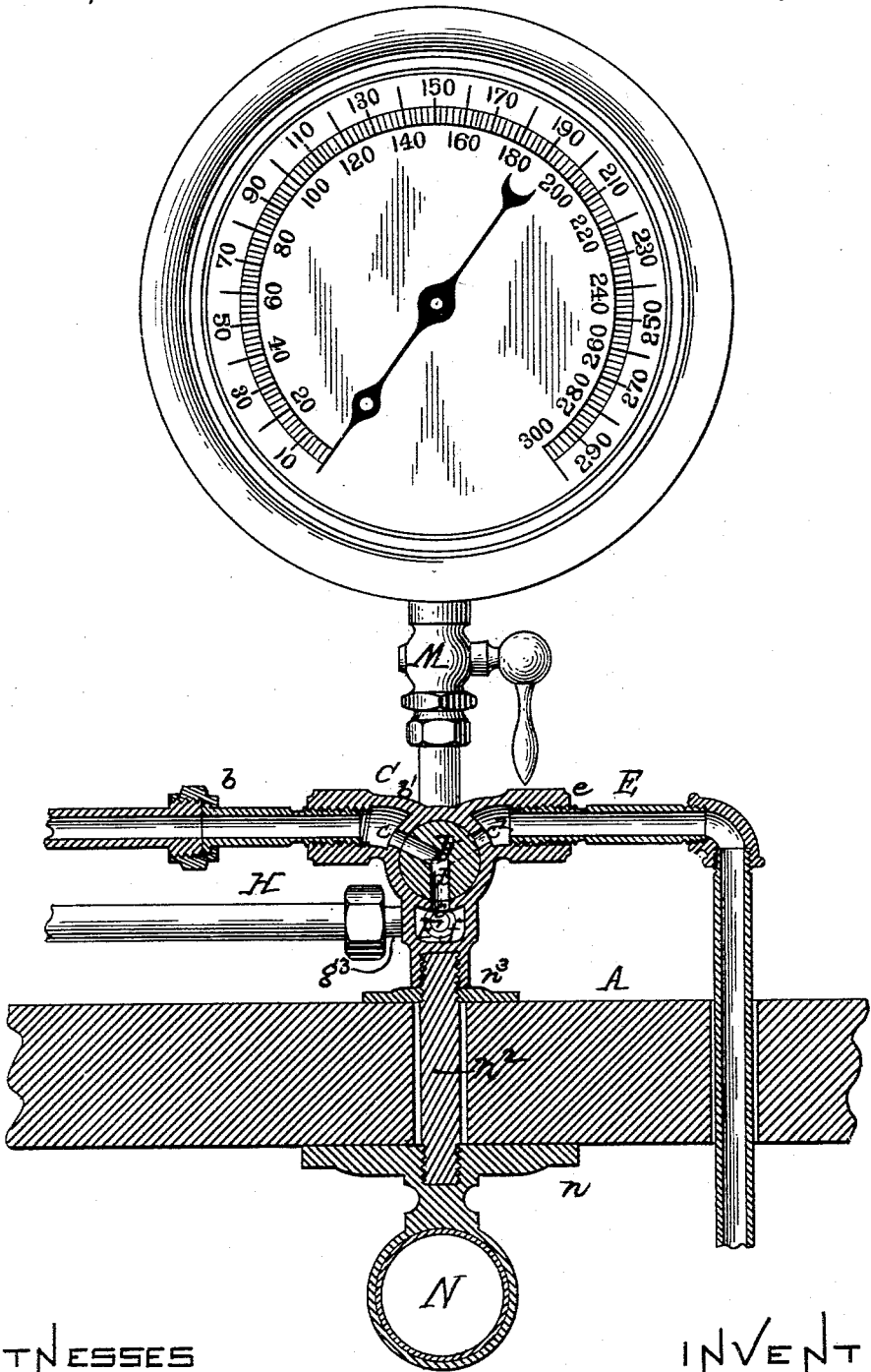

UNITED STATES PATENT OFFICE.

CHARLES BARTLETT BOSWORTH, OF EVERETT, ASSIGNOR TO THE CROSBY STEAM GAGE AND VALVE COMPANY, OF BOSTON, MASSACHUSETTS.

DEVICE FOR TESTING PRESSURE-GAGES.

SPECIFICATION forming part of Letters Patent No. 476,512, dated June 7, 1892.

Application filed February 17, 1892. Serial No. 421,870. (No model.)

*To all whom it may concern:*

Be it known that I, CHARLES BARTLETT BOSWORTH, a citizen of the United States, residing at Everett, in the county of Middlesex and State of Massachusetts, have invented certain new and useful Improvements in a Device for Testing Gages; and I do hereby declare the following to be a full, clear, and exact description of the invention, such as will enable others skilled in the art to which it appertains to make and use the same.

This invention relates to an improved device for testing pressure-gages; and it has for its object the production of a device in which there shall be an initial pressure due to gravity and in which the testing-pump shall be quickly placed in a position to exert pressure upon the gage to be tested.

The invention consists in the device hereinafter set forth in the claims.

Figure 1:
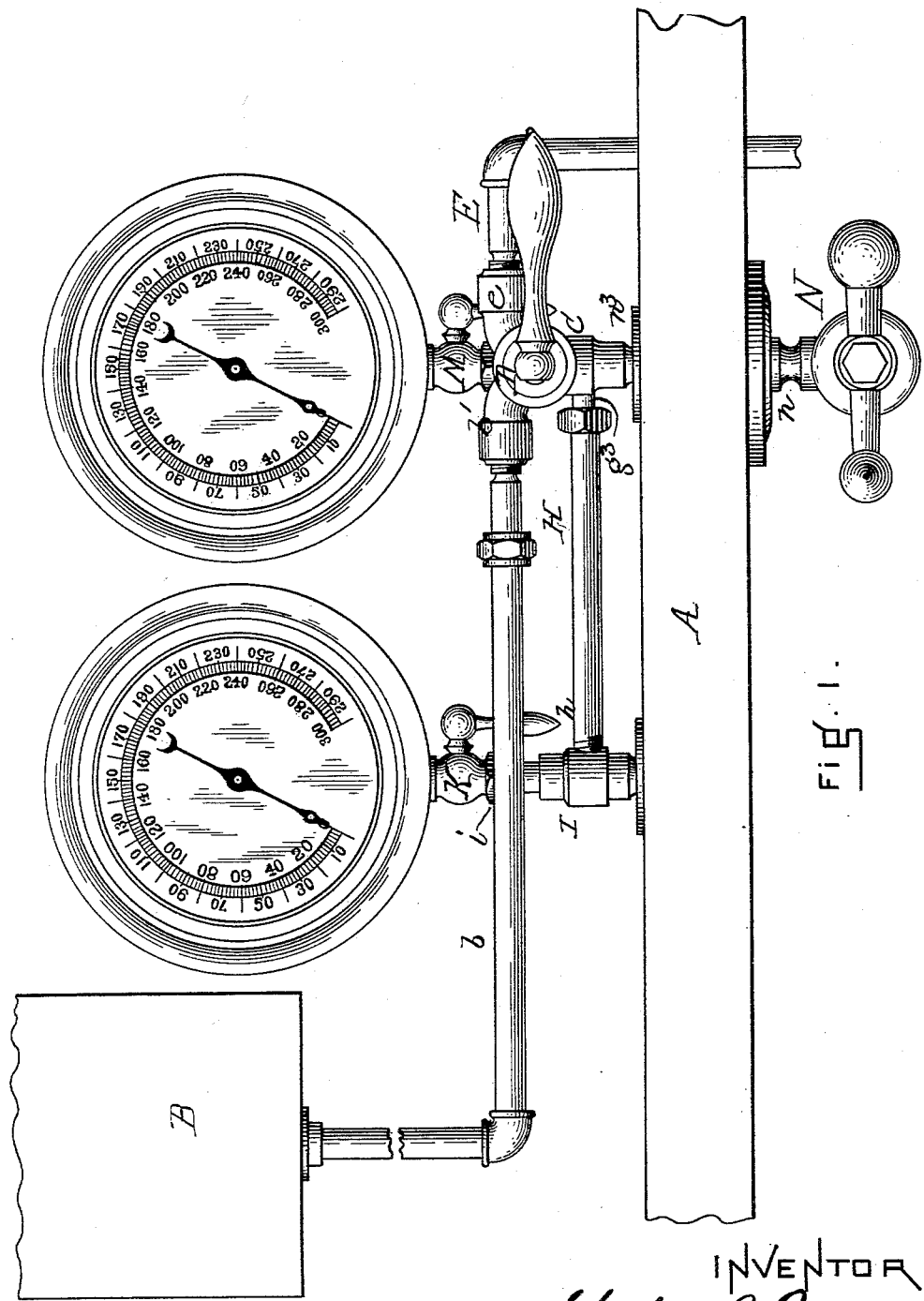
Figure 2:
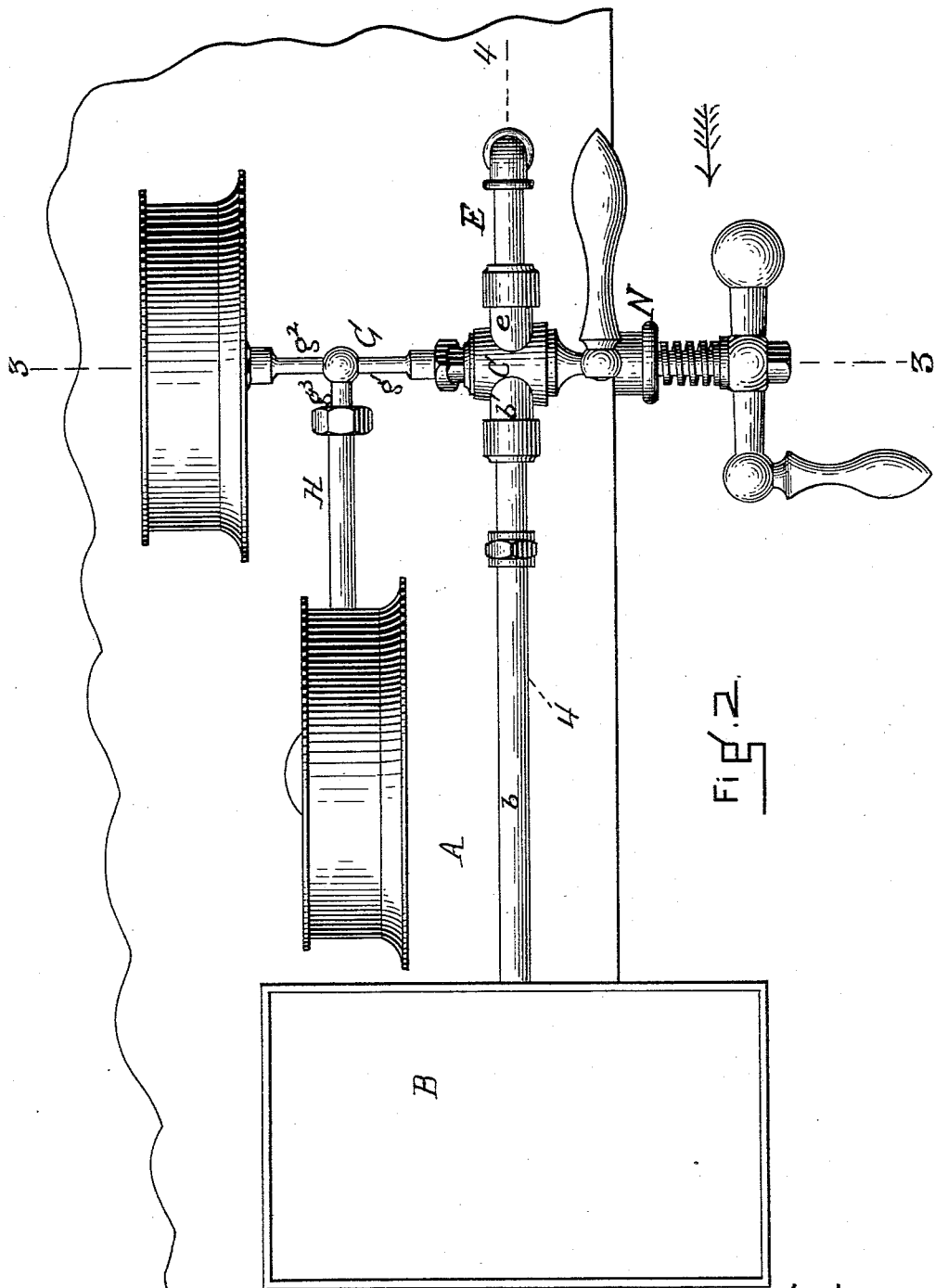

Referring to the drawings, Figure 1 represents the device in elevation as attached to the workman's bench, showing the reservoir for water detached and brought down near the supply-pipe in order to be shown in the drawings. Fig. 2 represents a plan view of the device. Fig. 3 represents a vertical cross-section through the line 3 3, Fig. 2, of all the parts below the gages attached as shown in the drawings. Fig. 4 shows a vertical longitudinal section through the line 4 4, Fig. 2.

In the drawings the letter A indicates any suitable support to which the parts are to be secured. From a reservoir or head of water B there runs a pipe $b$. At a convenient point thereon is placed the three-way valve-chamber C, having the ports $c$ $c'$ $c^2$, and containing the valve D, having the passage $d$, adapted to connect any two of these ports in the usual way. From this valve-chamber C there extends a waste-pipe E, connected with the nipple $e$, leading to the port $c^2$, and another pipe F, connected with the nipple $f'$, leading to the port $c'$, the pipe $b$ being connected with the nipple $b'$, leading to the port $c$. By this construction it will be seen that any two of these three pipes $b$, E, and F may be connected together through the valve-passage $d$. By a coupling $g$ there is connected to the pipe F the piping G, having the three branches $g'$, $g^2$, and $g^3$, the first and second in line and the third at an angle to these and all communicating with one another. From branch $g^3$ there runs a pipe H, at the end $h$ of which there is a vertical pipe I, which is supported upon the support A and at its top $i$ has the gage-cock K. The branch $g^2$ of the piping G is connected by a coupling $g^4$ with a pipe $l$, which is connected with fitting L, having the vertical passage $l'$. From the top of the fitting L there rises a gage-cock M. From the bottom of the fitting L a pipe $l^2$ passes down and through the support A and communicates with the barrel of a force-pump N, which is secured under this support by the brackets $n$ $n'$, the latter being at the point where the pipe $l^2$ comes into the pump. The bracket $n$ is held to the support A by a rod $n^2$, which is threaded to this bracket, and passing up through the support A is threaded into the bottom of a stand $n^3$ for the three-way chamber C.

With such a device, when water is turned on from the reservoir A and the passage $d$ connects the two ports $c$ and $c'$, water flows, with the initial pressure due to the head A, into the nipple $f$ and pipe F. Thence it passes through the piping G into the pipe H, fitting L, and pump N, the piston of the last being ready for a forward stroke. Upon the gage-cocks K and M are placed two gages, one being the standard and the other to be tested. As soon as the gage-cocks are open water flows into the gages. This water being under a certain pressure, it can at once be seen whether or not at the start the standard gage and the pressure due to the altitude of the water column coincide. The pump N is then operated and the pressure in the gages increased. As soon as the testing is finished the valve D is turned so that the passage $d$ connects the ports $c'$ and $c^2$, the water runs out, the tested gage is removed, and the operation repeated.

The ordinary pump for testing pressure-gages is so devised that water has to be raised by the strokes of the piston from some open vessel below it, into which the foot of the pump rests, to fill the pump-barrel, the pipes leading to the gages, and all the parts that require water to obtain a pressure within the tubes of the gages to be tested. Then the operator proceeds in the ordinary manner of raising the pressure by the operation of the pump. If a pump with a screw-plunger is used, then before the pump can be put in operation the barrel must be filled with water or other liquid to be used in the filling of the gage-tubes in testing the gages. In both cases when the pressure is released the water or liquid is allowed to run to waste by the opening of a valve; or, sometimes in the case of a screw-pump, the plunger may be returned by withdrawing the barrel and a portion of the water allowed to flow back into the barrel. In either case, however, the liquid used is largely wasted in the operation, and the supply must be restored either by pumping or pouring into the pump-barrel.

In the present device the purpose is to have the pump-barrel and all the parts leading from it to the gages automatically filled by a supply of water under pressure due to a head or otherwise, so that by the manipulation of the three-way cock it may run easily to them. The pump-barrel and other parts being so filled, the operator then by turning the screw-plunger is able to create the pressure desired. When the gage has been tested or the pressure which was desired obtained, by turning the three-way cock so that one of its ways or openings shall coincide with the waste-pipe E the pressure immediately is released and the water runs away. When in readiness to again test a gage or to obtain pressure in the pipes H and b', the three-way cock is at once turned so that one of its ways or openings shall coincide with the supply-pipe b, leading to the reservoir B, and the pipe leading to the pump-barrel and the gages to be tested. Instantly a flow of water takes place and a pressure is indicated upon the gage-dial equal to that of the pressure due to the head or other source of it. In practice this pressure may be anything sought; but that which is desirable is about five pounds. To this degree the test-gage is under every operation tested by gravity and instantly shows its accuracy in the beginning of the work.

Having thus described my invention, what I claim is—

1. As a means for testing gages, the combination of means for supplying water under pressure, a water-supply pipe, a pipe for the attachment of several gages, a waste-pipe, a valve giving communication among these three pipes, and a pump communicating with the pipe whereto the gages are to be attached, as set forth.

2. As a means for testing gages, the combination of means for supplying water under pressure, a water-supply pipe b, the three-way valve, the waste-pipe E, the gage-cocks K and M, the pump N, and the pipes for connecting the gage-cocks and the pump with the three-way valve, as set forth.

In testimony whereof I affix my signature in presence of two witnesses.

CHARLES BARTLETT BOSWORTH.

Witnesses:
J. H. MILLETT,
DUDLEY P. BAILEY.